United States Patent [19]

Makabe et al.

[11] Patent Number: 4,995,026
[45] Date of Patent: Feb. 19, 1991

[54] APPARATUS AND METHOD FOR ENCODING AUDIO AND LIGHTING CONTROL DATA ON THE SAME OPTICAL DISC

[75] Inventors: Dai Makabe, Shinjuku; Yuji Kumai, Shinagawa, both of Japan

[73] Assignee: Sony Corporation, Tokyo, Japan

[21] Appl. No.: 265,800

[22] PCT Filed: Feb. 5, 1988

[86] PCT No.: PCT/JP88/00108
§ 371 Date: Oct. 5, 1988
§ 102(e) Date: Oct. 5, 1988

[87] PCT Pub. No.: WO88/06338
PCT Pub. Date: Aug. 25, 1988

[30] Foreign Application Priority Data

Feb. 10, 1987 [JP] Japan ............... 62-29358

[51] Int. Cl.[5] ............... G11B 31/00; G11B 7/013; A63J 17/00
[52] U.S. Cl. ............... 369/70; 369/59; 369/275.3; 84/464 R
[58] Field of Search ............... 360/79, 80; 369/69, 369/70, 47–50, 54, 58, 59, 63, 64, 292, 275, 275.3; 340/723; 84/464 R

[56] References Cited

U.S. PATENT DOCUMENTS

| | | | |
|---|---|---|---|
| 4,587,643 | 5/1986 | Monen et al. | 369/59 |
| 4,613,965 | 9/1986 | Hori et al. | 369/59 |
| 4,641,295 | 2/1987 | Furukawa et al. | 369/59 |
| 4,697,176 | 9/1987 | Kawakami | 340/723 |
| 4,707,818 | 11/1987 | Suzuki et al. | 369/59 |
| 4,753,148 | 6/1988 | Johnson | 84/464 R |

FOREIGN PATENT DOCUMENTS

| | | |
|---|---|---|
| B37412/85 | 6/1985 | Australia . |
| 59-87603 | 5/1984 | Japan . |
| 59-87665 | 5/1984 | Japan . |

*Primary Examiner*—Aristotelis M. Psitos
*Assistant Examiner*—Steven R. Garland
*Attorney, Agent, or Firm*—Hill, Van Santen, Steadman & Simpson

[57] ABSTRACT

An optical disc suitable for a so-called KARAOKE equipment by which a singer sings into a microphone in accordance with a music signal recorded in a compact disc or laser disc. According to one embodiment of the present invention, in an optical disc in which a synchronizing signal, digital audio data and a sub-code signal are recorded in one frame, respective codes corresponding to a hue parameter, an intensity parameter and a fade-in or fade-out parameter are recorded in predetermined bits (user's bits) of the above-mentioned sub-code signal. Thus, it is possible to provide an optical disc which can automatically control the lighting equipment without hands by means of the reproduced output from the optical disc.

3 Claims, 4 Drawing Sheets

FIG. 1

| | R | S | T | U | V | W | |
|---|---|---|---|---|---|---|---|
| Sym 0 | 1 | 1 | 1 | 0 | 0 | 0 | --- MODE 7, ITEM 0: USER'S MODE |
| Sym 1 | 0 | 0 | 0 | 0 | 0 | 1 | --- 1: LIGHT CONTROL MODE |
| Sym 2 | PARITY $Q_0$ | | | | | | |
| Sym 3 | PARITY $Q_1$ | | | | | | |
| Sym 4 | 0 | 0 | 0 | 0 | 0 | 1 | --- COMMAND |
| Sym 5 | 0 | 0 | 0 | 1 | 1 | 1 | --- DATA SUBJECT TO COMMAND |
| Sym 6 | 1 | 0 | 0 | 0 | 0 | 0 | |
| 7 | . | . | . | . | . | . | |
| 8 | . | . | . | . | . | . | |
| 9 | . | . | . | . | . | . | |
| 10 | . | . | . | . | . | . | |
| 11 | . | . | . | . | . | . | |
| 12 | . | . | . | . | . | . | |
| 13 | . | . | . | . | . | . | |
| 14 | . | . | . | . | . | . | |
| 15 | . | . | . | . | . | . | |
| 16 | . | . | . | . | . | . | |
| 17 | . | . | . | . | . | . | |
| 18 | . | . | . | . | . | . | |
| 19 | . | . | . | . | . | . | |
| Sym 20 | PARITY $P_0$ | | | | | | |
| Sym 21 | PARITY $P_1$ | | | | | | |
| Sym 22 | PARITY $P_2$ | | | | | | |
| Sym 23 | PARITY $P_3$ | | | | | | |

4,995,026

APPARATUS AND METHOD FOR ENCODING AUDIO AND LIGHTING CONTROL DATA ON THE SAME OPTICAL DISC

The present invention relates to optical discs such as a compact disc, a laser disc or the like suitable for use with A KARAOKE EQUIPMENT and particularly to an optical disc in which lighting information is recorded in a user's which forms a part of a sub-code arranged in the format together with a synchronizing signal and a digital audio signal.

BACKGROUND ART

A so-called KARAOKE equipment is known, by which a singer is able to sing a song at a mike to the accompaniment of a music signal recorded on a compact disc or a laser disc. In this case, in order to improve stage effect, a lighting technician, while listening to a piece of music now played, usually makes control over brightness, hue or the like of a lighting apparatus in accordance with the level of a music signal or the frequency of the music signal.

However, according to the above-mentioned conventional method for controlling the lighting on the basis of the level of the music signal, the frequency thereof or the like, only the lighting control is simple, so that satisfactory stage effect could not be achieved. Further, a method in which a lighting staff really manipulates a lighting apparatus requires many hands, and also, it is difficult to reproduce the lighting.

DISCLOSURE OF INVENTION

The present invention is, in view of the above-mentioned aspect, to provide an optical disc which can improve stage effect associated with the lighting upon reproduction of a piece of music without hands.

According to one embodiment of the present invention, in an optical disc in which a music source is recorded, there is provided an optical disc in which a lighting information is recorded in its user's bit.

Further, according to the present invention, a lighting information is recorded in a user's form of an optical disc in which a music source is recorded so that a stage light control signal previously programmed is recorded in the user's form of the same medium as that of the music source. Thus, by controlling the lighting on the basis of the reproduced output, a sophisticated lighting control can be reproduced with ease and a stage effect associated with a lighting when listening to a piece of music can be increased.

BRIEF DESCRIPTION OF DRAWINGS

FIGS. 1, 2, 3 and 4 are respectively illustrations used to explain an embodiment of an optical disc of the present invention.

BEST MODE FOR CARRYING OUT THE INVENTION

An example of an optical disc of the present invention, or the application thereof to a compact disc will hereinafter be described with reference to FIGS. 1 to 7.

A sub-code and a music source are recorded in the compact disc to which the embodiment of the present invention is applied. Data format of the present compact disc will be described first with reference to FIGS. 2 and 3.

Figure 2:
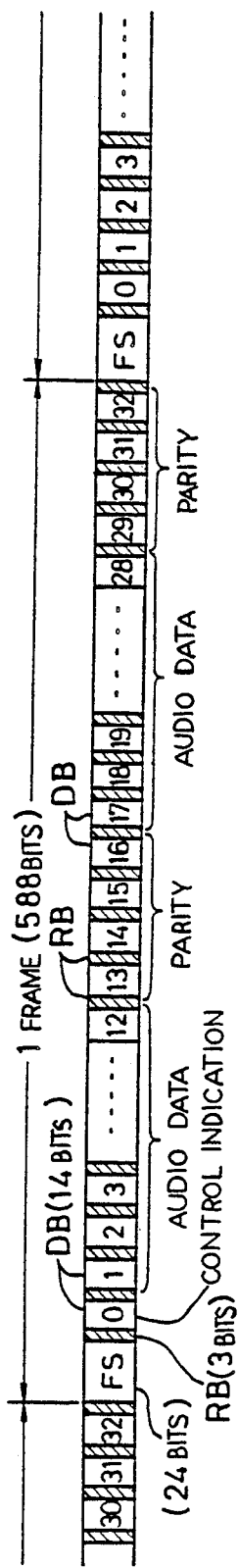

FIG. 2 shows one frame of data recorded in the compact disc, in which one frame assumes 588 bits of recording data. A frame synchronizing pulse FS of a particular data pattern at every frame is followed by a dc component suppression data RB of 3 bits. Further, there are provided 0 to 32nd data DB of 14 each and the dc component suppression data RB of 3 alternately. Of the data DB, the 0th data is what might be called a sub-code signal which is used to control the reproduction of the disc and to indicate a related information or the like. 1st to 12th and 17th to 28th data DB are assigned to audio data of main channel, wherein one word is formed of 16 bits and one frame contains informations of 12 words (6 samples x 2). The remaining 13th to 17th and 29th to 32nd data DB are assigned to parity data of error-correction codes in the main channel. The data DB each result from converting more significant 8 bits or less significant 8 bits of 16 bits in one word into 14 bits through an 8-to-14 conversion upon recording.

Figure 3:
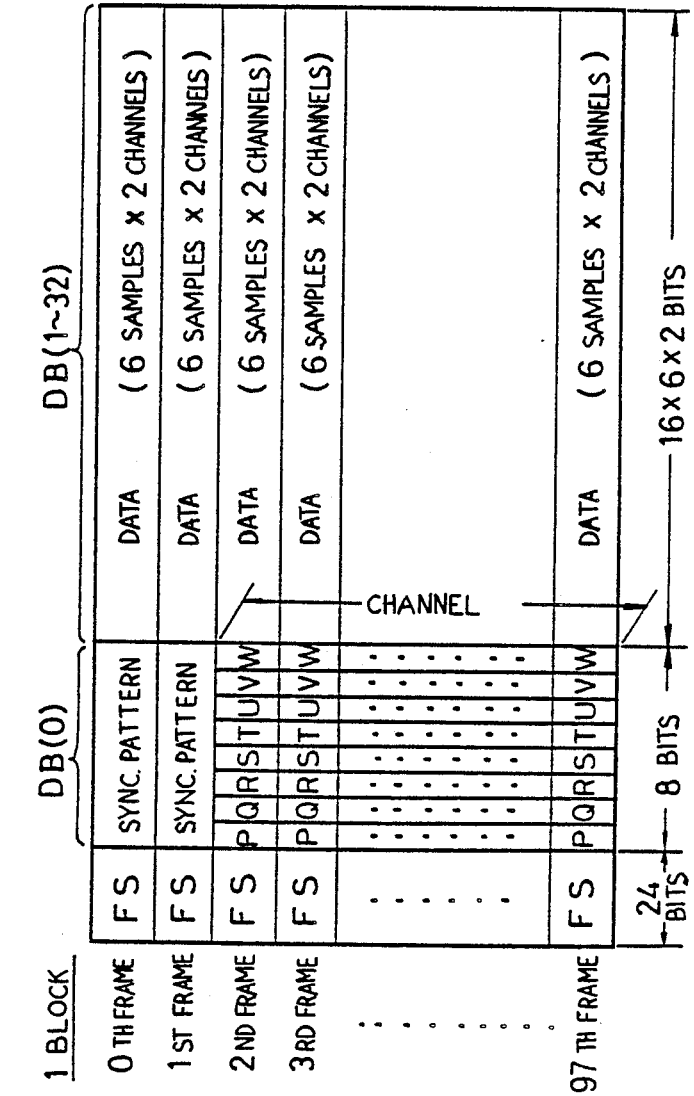

FIG. 3 shows a data format of one block where 98 frames are sequentially arranged in parallel to one another, removing the dc component suppression data and assuming that the data DB are each formed of 8 bits. Sub-code signals P to W of 0th and 1st frames constitute a sync. pattern of a predetermined pattern. With respect to the Q channel, error-detection CRC codes are inserted into 16 frames near the end of 98 frames.

The P channel is a flag used to indicate a pause mode and a music mode. This channel goes to low level for the music mode and to high level for the pause mode. Thus, this channel is made to be a pulse of 2 Hz cycle during a lead out interval so that a piece of music designated can be selected and then reproduced by detecting and counting the P channel. The Q channel enables the control of the same kind to be performed in a more sophisticated fashion. By way of example, a random music selection is made possible in such a manner that an information of the Q channel is supplied to a microcomputer provided within a disc reproducing apparatus to reproduce another music immediately while the reproduction of one music has not yet finished. Other remaining R to W channels are what might be called user's data, and they are used to indicate a poet, a composer, a comment, a poem of a piece of music recorded on the disc or the like and also used to comment on the same in voice.

Of the 98 bits of the Q channel, first 2 bits form a sync. pattern, next 4 bits form a control data, next 4 bits form an address data and following 72 bits form data. A CRC code for detecting an error is assigned to its end. 72 bits of the data contain a track number code TNR and an index code X. The track number code TNR changes from 00 to 99, and the index code X similarly changes from 00 to 99. Further, data of the Q channel contains a time-indicating code which indicates a time of a piece of music and a pause and a time-indicating code which indicates an absolute time which sequentially changes from the start of program area to the end of the outermost peripheral side of the compact disc. These time-indicating codes are each formed of codes of two digits representing minute, second and frame. One second is divided into 75 blocks. In order to access the compact disc at the unit shorter than a piece of music as in digital data, the above time-indicating code concerning the absolute time is used.

In such a compact disc, vacant R channel to W channel are called user's bits which can be freely used by the user.

In the present embodiment, as shown in FIG. 1, in the user's data of the sub-code on the compact disc which can be freely used by the user, a lighting information is recorded as a user's mode.

Figure 4:
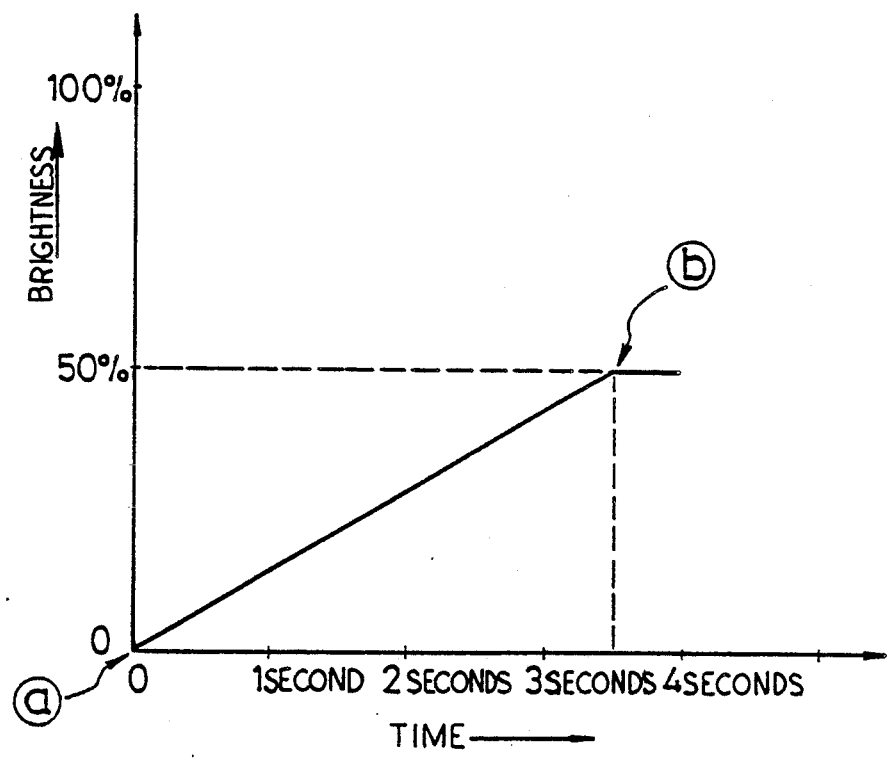

In FIG. 1, [1.1.1.0.0.0] on symbol 0 expresses mode 7 and item 0 forming the user's mode. [0.0.0.0.0.1] on symbol 1 expresses a light control mode. An error-correction code is inserted into symbols 2 and 3, and a red color control command code is inserted into symbol 4. As the above-mentioned control command code, 3 kinds of [0.0.0.0.0.0] (no operation NOP), [0.0.0.0.0.1] (fade-in) and [0.0.0.0.1.0.1] (fade-out) are selected and inserted. In this embodiment, fade-in, [0.0.0.0.0.1] is inserted. A speed parameter code for fade-in or fade-out is inserted into symbol 5. As the speed parameter code, 0 to 32 seconds, for example, are respectively made equivalent to [0.0.0.0.0.0] to [1.1.1.1.1.1], respectively. In this embodiment, [0.0.0.1.1.1] is selected and is made equivalent to 3.5 seconds. An intensity parameter code is inserted into symbol 6. As the intensity parameter code, for example, 0% to 100% are respectively made equivalent to [0.0.0.0.0.0] to [1.1.1.1.1.1]. In this embodiment, [1.0.0.0.0.0] is selected and is made equivalent to 50%. In this embodiment, when this command is executed, such a control is carried out that, as shown in FIG. 4, the red light is gradually increased to brightness 50% (point ⓑ) from brightness 0% (point ⓐ) presented before the command is executed in 3.5 seconds.

Green color and blue color control command codes are respectively inserted into symbols 7 and 10 similarly as described above, green and blue fade-in and fade-out speed parameter codes are respectively inserted into symbols 8 and 11 similarly as described above, and green and blue intensity parameter codes are respectively inserted into symbols 9 and 12. Further, data concerning other light control modes (lighting informations) may be inserted into symbols 13 to 19, if necessary. Error-correction codes are inserted into symbols 20 to 23.

Figure 5:
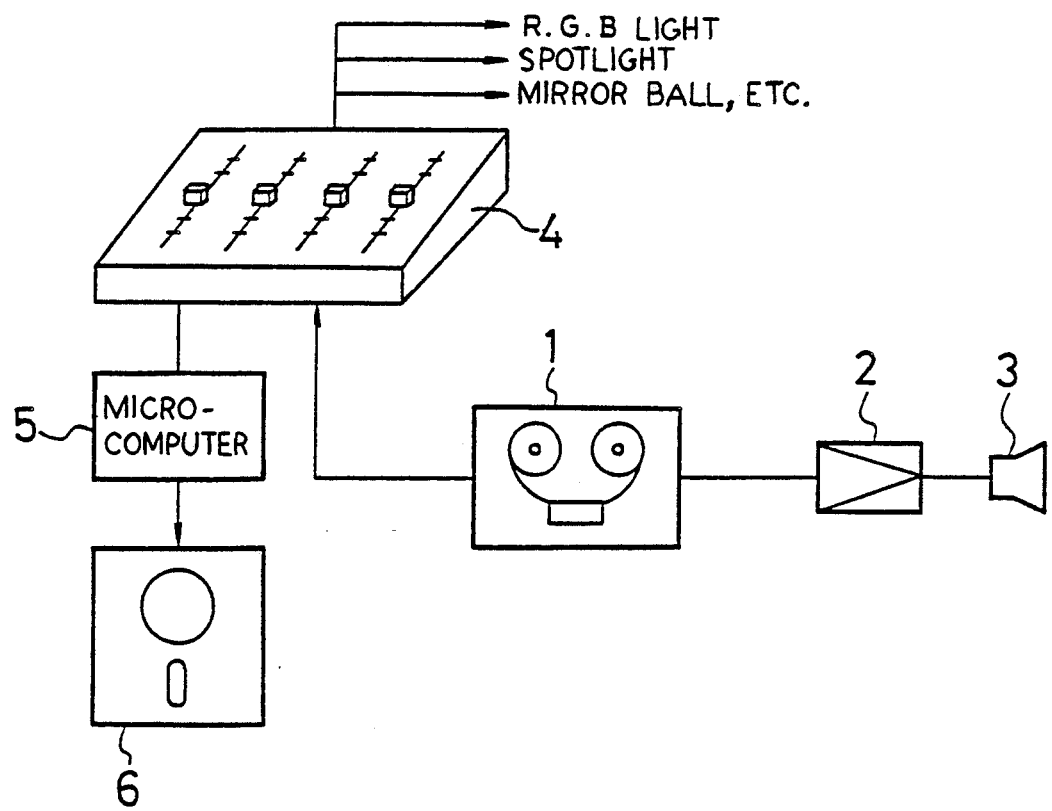
FIG. 5 is a block diagram showing an example of how to edit the data shown in FIG. 1.
Figure 6:
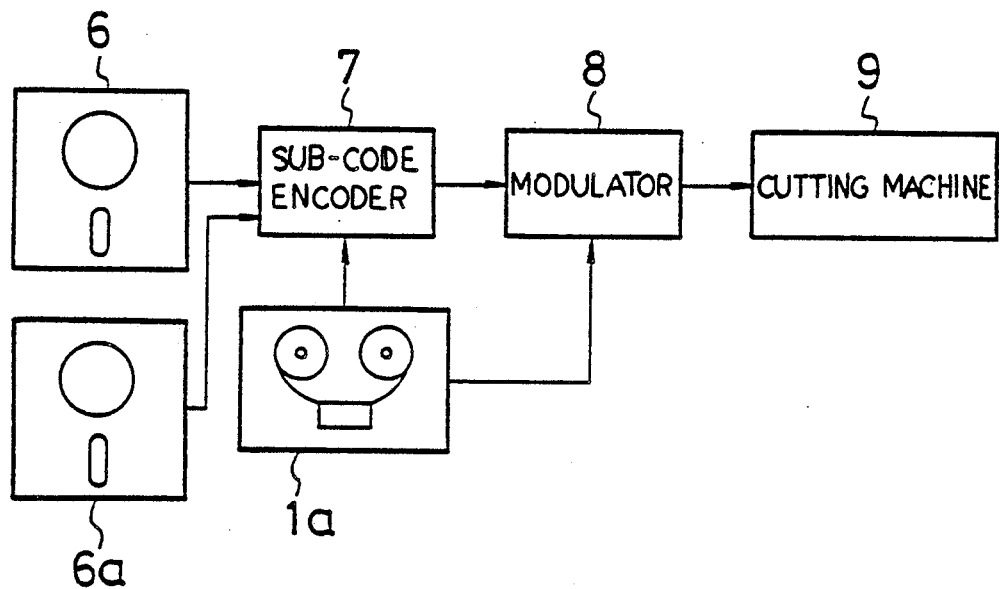
FIG. 6 is a block diagram showing an example of how to cut the data shown in FIG. 1

A lighting control program matched with a piece of music to be produced in such an optical disc is made as shown in FIG. 5. That is, reference numeral 1 represents a reproducing apparatus which reproduces a music source having a time code (sub-code Q channel) recorded in a compact disc. This reproducing apparatus 1 reproduces a music signal and a time code signal of this music source. The music signal from the reproducing apparatus 1 is supplied through an amplifying circuit 2 to a speaker 3 which emanates a reproduced sound. Also, the time code signal from this reproducing apparatus 1 is supplied to a light adjusting console 4. While listening to a piece of music from the speaker 3, an editor operates this light adusting console 4 to make control programs for red, green and blue lights, spot light, mirror ball and the like. The control signal of this control program and a time information (based on the time code signal) to be controlled, derived from the light adjusting console 4 are recorded in a floppy disk 6 through a microcomputer 5. When the compact disc of this embodiment is made, as shown in FIG. 6, graphic data recorded on the floppy disk 6 and derived from a lighting program data disk 6a is produced therefrom in synchronism with a time code from a music source 1a having the time code, supplied to a sub-code encoder 7 and is thereby encoded. The thus encoded data is supplied to a modulator 8 and the music source 1a having the time code is converted into PCM music data with a compact disc format. This PCM music data is supplied to the modulator 8. This modulator 8 produces at its output side PCM music data shown in FIGS. 1 to 3. This music data is supplied to a compact disc cutting machine 9 which cuts a compact disc to thereby produce a compact disc with the lighting information of this embodiment inserted thereinto.

Figure 7:
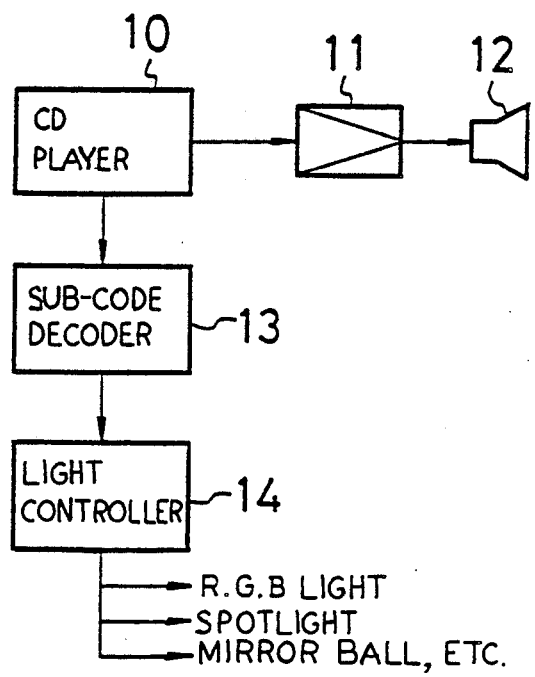
FIG. 7 is a block diagram showing an example of an apparatus for reproducing an optical disc of the present invention.

The compact disc with the above-mentioned lighting information of this embodiment inserted is reproduced as shown in FIG. 7.

The compact disc with the above lighting information inserted is reproduced by a compact disc player 10 which is constructed similarly to a conventional compact disc player. The music signal reproduced by this compact disc player 10 is supplied through an amplifying circuit 11 to a speaker 12 which emanates a reproduced sound. Also, the sub-code data obtained by this compact disc player 10 is supplied to a decoder 13, and a control signal based on the control program from the decoder 13 in accordance with the light control mode as shown in FIG. 1 is supplied to a light controller 14. Thus, the light controller 14 controls the red, green and blue lights, the spotlight, the mirror ball or the like in accordance with the control program.

Therefore, according to this embodiment, since the lighting information is recorded in the user's data of the compact disc in which the music source having the time code is recorded, the stage control signal previously-programmed is inserted into the user's data of the same media as those of the music source. Thus, by controlling the lighting based on the control signal, it is possible to easily reproduce the highly-effective lighting control. Therefore, stage effect presented by the lighting while listening to the music can be increased. Further, since the compact disc player 10 for KARAOKE generally includes the sub-code data decoder 13, if the light controller 14, the red, green and blue lights, the spotlight, the mirror ball and so on are provided, the lighting can be controlled effectively without hands. Thus, the present invention is very effective in the application to the so-called KARAOKE. Further, in addition to the lighting information, it may be possible that control data for ending a piece of music at the end of one music is recorded in the user's data, whereby the muting is effected by the decoder output.

Furthermore, while the present invention is applied to the compact disc in the above-mentioned embodiment, it is needless to say that the present invention can be applied to other optical discs such as a laser disc or the like. In addition, it is needless to say that the present invention is not limited to the above-mentioned embodiment but can take various modifications thereof without departing from the gist of the invention.

According to the present invention, the highly-effective lighting control can be reproduced with ease in accordance with the lighting data program. Thus, the stage effect can be increased by the lighting while listening to a piece of music.

We claim:

1. In an optical disc on which a synchronizing signal, a sub-code signal which contains lighting control information and audio data are recorded and wherein said recorded optical disc is to be played back so as to reproduce the audio signal from said audio data with an audio reproducing system and at least one light display means such as a spot light, a mirror ball or red, green and blue lights are controlled by said lighting control information and said lighting control information contains information for hue control, intensity control, fade-in and fade-out control including the speed of fade-in and fade-out.

2. An optical disc according to claim 1, in which a predetermined bit of said subcode signal is made as a user's data.

3. An optical disc reproducing apparatus for reproducing an audio signal an d a lighting control signal from an optical disc to control at least one illumination device such as a spot light, a mirror ball or red, green or blue lights, an optical disc player for reproducing said audio signal and said lighting control signal from said optical disc, a light controller receiving said lighting control signal to produce at least one signal for controlling at least one of said spot light, said mirror ball, said red, green or blue lights and the light controller producing information for hue control, intensity control fade-in and fade-out control including the speed of fade-in and fade-out.

* * * * *